Oct. 20, 1959
A. SCHEITERLEIN
2,909,074
TENSIONING DEVICE
Filed Dec. 13, 1957
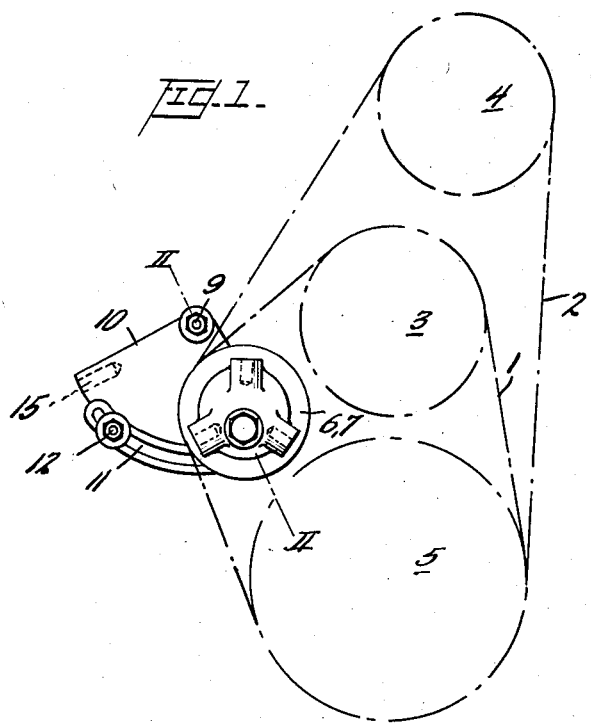
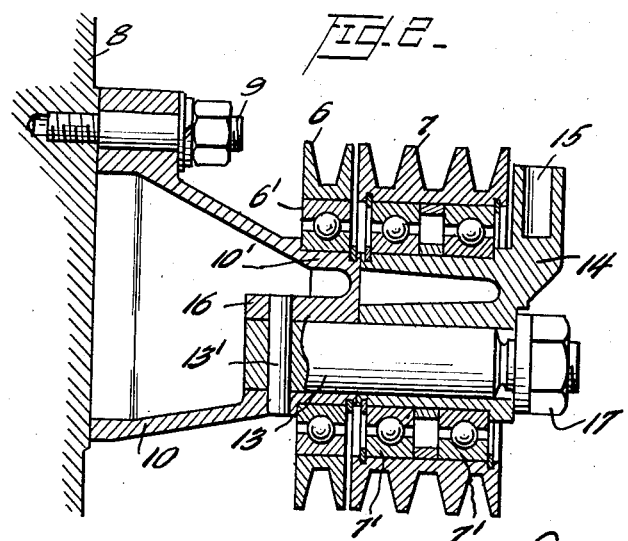
INVENTOR
Andreas Scheiterlein
BY Watson, Cole, Grindle & Watson,
ATTORNEYS.

2,909,074

TENSIONING DEVICE

Andreas Scheiterlein, Graz, Austria, assignor to Hans List, Graz, Austria

Application December 13, 1957, Serial No. 702,567

4 Claims. (Cl. 74—242.16)

This invention relates to a tensioning device for a plurality of belt drives transmitting power from a common source to separate locations.

As a result of the increasingly widespread use of belt, chain or similar endless flexible drives for shafts, certain types of machinery, in particular agricultural and textile machines, as well as internal combustion engines, are frequently equipped with a plurality of drives of this type arranged side by side in parallel planes. With a view to reducing construction costs it has already been suggested to provide such drives with tensioning members for the individual belts mounted on arms which can be pivoted around a common axis. Since the tensioning of the various drives has to be independent from each other, it was found to be necessary to provide separate arms for the respective drives together with the required individual adjusting facilities for these arms. This not only raises the problem of space whenever a drive necessitates a plurality of belts, but makes for comparatively large and massive tensioning devices. In addition, it is difficult to lock the tensioning members against shifting after the setting of the required tension of the drives.

According to the invention these drawbacks are eliminated by providing a single tensioning body pivoted on the machine housing and carrying the tensioning rollers of a plurality of belt drives. The possibility of adjusting tension in individual drives is afforded by the adjustability of the carriers of individual tensioning rollers relative to the carrying axles of the rest of the tensioning rollers. For that purpose the carriers are pivoted around bolts located in the tensioning body and arranged within the bearing diameter of the adjacent roller in the direction of the housing wall and eccentrically relative to the latter. Preferably the tensioning device is designed in such a manner that the tensioning roller of the drive adjacent to the housing wall is mounted directly on the tensioning body whereas the remaining tensioning rollers more remote from the housing wall are arranged for adjustment on and relative to the tensioning body.

The accompanying drawing illustrates a preferred embodiment of the invention in which:

Fig. 1 is a partly schematic view showing the front elevation of the tensioning device as well as two separate V-belt drives with which it cooperates.

Fig. 2, also partly schematic, shows a section taken on line II—II of Fig. 1, and includes a portion of the supporting engine block or other means for the belt drives.

The reference numbers 1 and 2 designate the drives of pulleys 3 and 4 drive by the same shaft on which the respective driving pulleys 5 pertaining to the various drives are mounted in series. The width of the tensioning rollers or pulleys 6, 7 for the respective drives is determined by the number of belts used in the various drives. In the illustrated embodiment, the drive 2 is of the multiple-belt type, and its pulley 7 is accordingly a multiple pulley. However, the drive 1 and accordingly its pulley 6 are of the single-belt type.

The tensioning body 10 is pivoted on the wall 8 of the machine or engine housing for angular adjustment about a fixed pivot or stud 9. The tensioning body 10 is selectively locked in the desired position by means of a screw 12 disposed through an arcuate slot 11 which may be formed either in the tensioning body or in a clamp fixedly carried by the tensioning body.

The body 10 supports the pulleys 6 and 7 for rotation about axes which are parallel and eccentric to the axis 9 of angular adjustment of the body 10. The said eccentric axis of at least one of said pulleys 7 is adjustable relative to both the axis 9 of the body 10, and to the eccentric rotational axis of another said pulley 6.

To this end the body 10 is formed to provide an integral cylindrical hub 10' defining the eccentric axis of the pulley 6, and the pulley is rotatably supported on said hub preferably by a usual ball bearing assembly 6'. Thus, in this embodiment the rotational axis of the pulley 6 is fixed with respect to the axis of angular adjustment 9 of the body.

Relative adjustability, as aforementioned, between the axes defined by the pivot 9 and hub 10', and the rotational axis of multiple pulley 7, is attained by means of an adjustable carrier 14, which is exemplified by a cylindrical bushing pivoted on a stub axle 13 for angular adjustment about an axis parallel to and eccentrically displaced from that of the pulley 6. Stub axle 13 is secured by a cross pin 13' in an eccentric socket 16 in the adjacent axial end of the hub 10'. Tandem ball bearings 7' preferably are employed to rotate the pulley 7 on carrier 14. The carrier may be secured in any selected position of angular adjustment about axis 13, by suitable means such as the nut 17 threaded on the free end of shaft 13, for adjustment in obvious manner to clamp the carrier against the adjoining end face of hub 10'. One or more radial sockets 15 may be provided on the hub 14 for reception of a suitable adjusting rod or lever, to facilitate the proper angular adjustment of carrier 14 against the tension of its associated belt drive 2.

For adjusting the tension of the belts of both drives the nut of bolt 13 is first loosened sufficiently for the carrier 14 to turn round in relation to the body 10. After loosening bolt 12 the body 10 is turned (to the left in Fig. 1) until such time when the belt 2 running over the roller 6 is adequately tensioned. After fixing the body 10 in that position, part 14 only needs to be turned sufficiently for the belt 1 to have achieved adequate tension by means of the roller 7. Finally, the carrier 14 is fixed in relation to 10 by tightening the nut on bolt 13, whereupon both drives will be ready for operation.

Various embodiments of the invention may be employed within the scope of the accompanying claims. For example, the number of drives need by no means be restricted to two. The provision of a third drive in addition to the two illustrated ones is easily possible especially if the drive shown in Example 1 presents a single belt only. Then the members destined for the support of the roller 7 will have to be attached to part 14 in accordance with an appropriate embodiment. However, the same result can also be achieved if the tensioning rollers of the additional drives are also seated on the bolt 13 which in that case should be of a correspondingly greater length, by means of their respective carriers of the type hereabove described for the roller 7. Then all rollers can be clamped down against the tensioning body after their setting by means of bolt 13.

Obviously, the various details of the preferred embodiment herein described may be modified in various ways,

Having thus described the invention, I claim:

1. In a multiple-belt drive of the class wherein power is transmitted by separate belt drives from a common multiple drive pulley to separate driven pulleys, the combination with said multiple-belt drive of a carrier body, means supporting said body for angular adjustment about a fixed axis adjacent said belt drives, means cooperating with said body and its supporting means for securing said body in any of various selected positions of angular adjustment, a first tensioning pulley carried by said body for rotation about an axis parallel and eccentric to said fixed axis, said pulley operatively engaging one said belt drive, a second pulley rotatably supported on said body in operative engagement with said second belt drive, and for bodily angular adjustment about an axis eccentric to that of said first pulley, and means cooperating with said second pulley for securing same in selected positions of adjustment.

2. The combination of claim 1, wherein said body is formed with a hub located eccentrically to its said fixed axis for rotatably supporting said first tensioning pulley.

3. The combination of claim 2, including a cylindrical carrier mounted on said body for angular adjustment about an axis eccentric to the axis of said carrier, said second pulley being journalled on said carrier.

4. A multiple-belt tensioning device comprising a carrier body and a pivot supporting same for angular adjustment, means for securing said body in adjusted position, a first tensioning pulley carried by said body for rotation about an axis eccentric to the said pivot, and a second tensioning pulley rotatably carried by said body for bodily adjustment relative to said first pulley.

References Cited in the file of this patent

UNITED STATES PATENTS

| | | |
|---|---|---|
| 1,535,568 | Bornschein | Apr. 28, 1925 |
| 2,526,242 | La Salle | Oct. 17, 1950 |

FOREIGN PATENTS

| | | |
|---|---|---|
| 539,253 | France | Mar. 30, 1922 |
| 570,909 | Great Britain | July 27, 1945 |
| 637,049 | Great Britain | May 10, 1950 |